Dec. 8, 1970   H. SCHNEIDER   3,545,875
PROCESS AND APPARATUS FOR PRODUCING GAS/LIQUID MIXTURES
Filed Jan. 4, 1968   3 Sheets-Sheet 1

INVENTOR:
HELMUT SCHNEIDER
BY
Karl F. Ross
Attorney

Dec. 8, 1970   H. SCHNEIDER   3,545,875
PROCESS AND APPARATUS FOR PRODUCING GAS/LIQUID MIXTURES
Filed Jan. 4, 1968   3 Sheets-Sheet 2

INVENTOR:
HELMUT SCHNEIDER
BY
Karl F. Ross
Attorney

INVENTOR:
HELMUT SCHNEIDER
BY
Karl F. Ross
Attorney

United States Patent Office 3,545,875
Patented Dec. 8, 1970

3,545,875
PROCESS AND APPARATUS FOR PRODUCING
GAS/LIQUID MIXTURES
Helmut Schneider, Mainz (Rhine), Germany, assignor to
Werner & Mertz G.m.b.H., Mainz (Rhine), Germany,
a corporation of Germany
Filed Jan. 4, 1968, Ser. No. 695,654
Claims priority, application Germany, Jan. 5, 1967,
1,557,240; Apr. 20, 1967, 1,557,245
Int. Cl. B44d 3/28
U.S. Cl. 401—197
15 Claims

ABSTRACT OF THE DISCLOSURE

To produce a gas/liquid mixture, particularly a foaming substance to be used for cleaning or other purposes, a gas (preferably air) and a foamable liquid are introduced into the interior of a tubular roller of spongy material, the roller being subjected to recurrent peripherally progressive local deformation with alternate radial compression and expansion whereby the two constituents are aspirated into the interstices thereof and then expelled as a mixture. The discharge of the mixture may take place through the outer periphery of the roller or through a special channel near the roller axis separated by a partition from another channel connected to the fluid inlet; in the latter case, the roller body turns on a perforated tubular shaft containing the channels so as to communicate with the inlet channel when expanding and with the discharge channel when undergoing compression. Specific utility: Cleaning of carpets and upholstered furniture.

My present invention relates to a process and an apparatus for producing a gas/liquid mixture, particularly (though not exclusively) a foaming substance adapted to be used for the cleaning of carpets or upholstered furniture, for the extinction of fires, or for a variety of other purposes such as, for example, the manufacture of cushioning or insulating material by further chemical treatment.

In the cleaning industry, the use of detergent foam is highly effective since the foamed surfactant can be spread over a large area of a fabric or other article to be cleaned and, by virtue of its greater affinity for soil particles, will readily remove such particles from the substrate. Conventional methods of making such foams, e.g. by means of a vessel in which the liquid detergent is intensely agitated with consequent generation of numerous air bubbles therein, tend to produce a substrate of relatively high moisture content which, without materially aiding in the removal of spots, may have a detrimental effect upon the fabric. Moreover, this type of equipment is relatively bulky and not conveniently portable as required, for example, in the case of a fire extinguisher.

It is, therefore, the general object of my present invention to provide an improved process and apparatus for making foam, or some other gas/liquid mixture in which the constituents are to be thoroughly mingled, in a simple, effective and substantially continuous manner and without the need for heavy motor-driven equipment.

A more particular object of my invention is to provide an apparatus of this description which can simultaneously be used as an applicator for the resultant mixture, e.g. as a scrubber of furniture, carpets, floors, etc. to be cleaned.

In accordance with the present invention, I utilize a spongy roller of natural or synthetic material, having a partly or completely open cell structure, to aspirate the gaseous and liquid constituents of the desired mixture, and to combine these constituents within the interstices of its porous body before again expelling them, the roller body being subjected for this purpose of recurrent peripherally progressive local deformation with alternate radial compression and expansion. In a particularly simple embodiment, the roller body is deformed in the aforedescribed manner by being displaced along a contact surface; thus the roller may be rotatably mounted on a shaft rigid with a handle therefor for reciprocating motion across the floor of a room or some other surface to be treated.

Advantageously, pursuant to a more particular feature of my invention, the roller-supporting shaft is tubular and designed as a supply conduit for a foamable liquid and a gaseous foaming agent therefor, the latter being preferably ambient air. These constituents pass through the perforated peripheral wall of the tubular shaft into the expanding portions of the surrounding roller body and are discharged therefrom upon subsequent recompression of the expanded portions. The discharge of the mixture may occur through the outer periphery of the roller body, either directly or by way of a protective and apertured shell encasing the spongy material. Since, however, the roller body or its shell may pick up dirt or other extraneous matter when passing over the surface to be treated, I prefer to make the shell imperforate and to provide for the discharge of the mixture through an outlet from a separate compartment of the tubular shaft. Thus, the interior of that shaft may be longitudinally partitioned to form an inlet compartment, communicating with the expanding portions of the roller body, and an outlet compartment, communicating with the body portions undergoing compression. The inlet compartment, in turn, may be further subdivided into separate sections for the liquid and for air or other gas, the liquid section or sections communicating with the body at one or more locations spaced rearwardly from the area of maximum compression (as viewed in the direction of roller rotation) whereas the gas section or sections open toward the roller body at points between these locations and the area of maximum compression so that air or other gas may enter the interstices of the body ahead of the liquid for more effective dispersion of the latter upon subsequent reexpulsion. As long as the handle or other operating means is rigidly connected with the roller shaft, the line of maximum compression can be easily made to lie within a relatively narrow peripheral sector so that the aforestated relationships can be readily maintained.

Although, in principle, the device just described can be powered by an electric motor or other automatic means, manual operation will be satisfactory for most purposes. The operating handle may conveniently be used as an extension conduit of the tubular shaft through which liquid may be admitted into the interior of the roller from a reservoir carried on the handle. This is particularly advantageous when the device is used for the cleaning of carpets or rugs, with the handle lying rearwardly from the floor at an arcuate angle of, say, 45° to split the applied force into a downward pressure and a forward thrust.

The invention will be described in greater detail with reference to the accompanying drawing in which.

Throughout the drawing, analogous elements are designated by similar reference numerals differing only in their hundreds digits.

Figure 1:
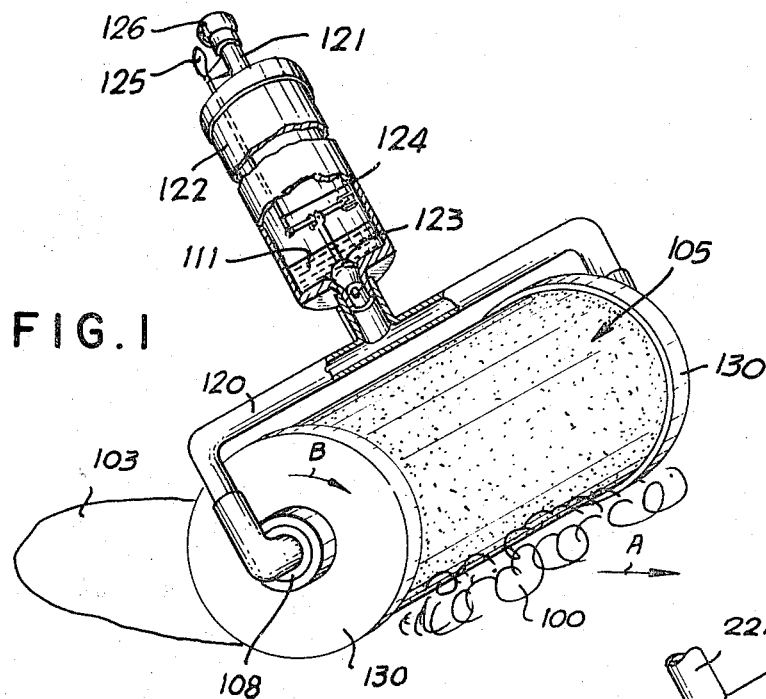
FIG. 1 is a perspective view (parts broken away) of an apparatus embodying the invention.

In FIG. 1 I have shown a simple embodiment comprising a cylindrical roller body 105 of resilient spongy material which is mounted on a tubular shaft 108 and whose ends surrounding that shaft are closed by fluid-tight, flexible membranes 130 (only one shown). If the body 105 is made of foam rubber or the like, the membranes 130 may consist of a similar but nonporous substance of the type usually recovered as a byproduct in the manufacture of solid foams. The ends of shaft 108 are joined to a tubular yoke 120 integral with a handle 121. This handle, which for rug-cleaning and similar purposes should be long enough to permit operation by a user in standing position, carries a refillable reservoir 122 for a cleaning fluid 111, such as an aqueous solution of a commercial detergent of foamable character. The outflow from reservoir 122 into the hollow handle 121, from which the liquid is gravity-fed to the tubular shaft 108, contains a stop valve 123 adapted to be opened by a rod 124 which terminates in an actuating lever 125 near the knob 126 of the handle.

When the implement is idle, i.e. when its roller 105 does not contact any surface to be cleaned, the spongy body is centered on the axis of shaft 108. In operation, however, with the roller 105 resting on the surface 103 of a rug, carpet or other type of flooring, its own weight together with pressure exerted upon the knob 126 deforms the roller body and partly flattens it along its area of contact with surface 103 whereby its cellular structure is compressed. As the roller is pushed forwardly in the direction of arrow A, it is frictionally rotated as indicated by arrow B so that the zone of compression progressively travels around its periphery, with gradual re-expansion of the body portions previously compressed. The tubular wall of shaft 108 is perforated, as illustrated in subsequent figures relating to other embodiments, so that the expanding portions of body 105 aspirate liquid 111 from within the shaft and air from the outside into the labyrinth of their cell structure where these two constituents are intermingled for joint expulsion as a mixture 100 upon subsequent recompression. Since the point of discharge of mixture 100 is always below the shaft 108, relatively little fluid will be returned to the interior of the shaft during such recompression.

Figure 2:
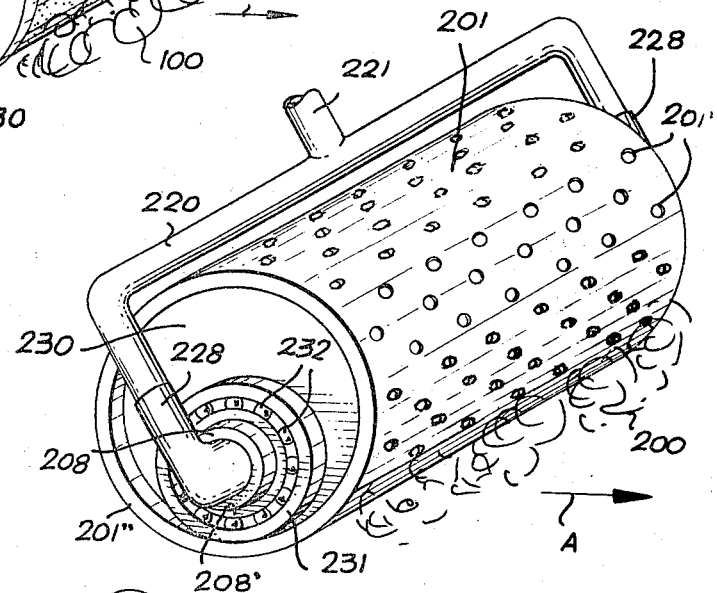
FIG. 2 is a view similar to FIG. 1, showing a modification.

In order to reduce the wear of the spongy roller body, the latter may be enclosed in a protective shell which may be either flexible or rigid and which, for a device operating in the manner described with reference to FIG. 1, should be apertured to permit the peripheral discharge of foam substance. FIG. 2 shows a rigid shell 201 with apertures 201' through which the mixture 200 exits as in the preceding embodiment and air can be aspirated. Shell 201 projects laterally, as illustrated at 201", beyond the end membranes 230 to form a circular track for a ring 231 constituting the outer race of a ball bearing 232 whose inner race 208' is an axial extension of roller shaft 208 which terminates at each end in an upwardly bent nipple 228 receiving a respective arm of the tubular yoke 220. The operation of the apparatus of FIG. 2 is identical with that of FIG. 1, except that the bearing assembly 208', 231, 232 positively limits the degree of compression of the spongy roller body and determines the eccentricity of shaft 208 with reference to shell 201.

The tubular roller body may be adhesively or otherwise secured to its shell 201 and may be similarly fastened to an inner apertured sleeve surrounding the roller shaft. Such a sleeve has been illustrated at 306 in FIG. 3 which, in addition, shows a modification wherein the outer shell 301 is imperforate so that separate outlet means must be provided for the discharge of the foam from the interior of the roller. At 301A I have illustrated a position coaxial with shaft 308 which the shell 301, here again designed as a rigid cylinder, assumes when not resting under pressure on a surface 303. Peripheral ribs 302 of sawtooth profile insure rotary entrainment of the roller 301, 305, 306 in the direction of arrow B when the assembly is advanced forwardly as indicated by arrow A. The relative radial displacement between shell 301 (centered on an axis $O_1$) and shaft 308 (centered on an axis $O_2$) may again be brought about simply by pressure, as in the embodiment of FIG. 1, or by positive engagement through eccentric bearing means, e.g. in the manner illustrated in FIG. 2 or as described hereinafter with reference to FIG. 4.

Shaft 308 is shown to be internally subdivided, by a tubular partition 310 with outer radial webs 313, into a central space 315' and two segmental compartments 315 and 316, compartment 315 communicating with the space 315' through a series of parallel segmental slots 317 in tubular wall 310 and being also partly open toward the ambient atmosphere via a set of air holes 312 in the upper portions of its two end walls. Space 315' opens at either or both ends into the hollow handle 321 by way of the yoke 320, the extremities of that yoke being again received in nipples 328 forming extensions of the inner tube 310. Compartment 316, on the other hand, opens at either or both ends into a yoke-shaped distributing pipe 327 which is disposed forwardly of the roller and has ports 327' for the discharge of the mixture 300. Compartments 315 and 316 are open toward the sleeve 306 by way of respective sets of parallel segmental slots 309 and 314, similar to slots 317.

In operation, with handle 321 occupying its rearwardly and upwardly inclined working position, the roller shaft 306 will be at least approximately in the position illustrated so that compartment 315 communicates, through apertures 307 in the outer shaft wall, with the expanding portions of the spongy body 305 behind the zone Z of contact with surface 303 whereas compartment 316 similarly communicates with the body portions undergoing compression on their approach to that zone. Thus, air from venting holes 312 and liquid 311 from space 315, are sucked into the interstices of the cell structure 315, are sucked into the interstices of the cellstructure of body 305 whence they are subsequently discharged into compartment 316 for delivery to distributor 327. The supply of additional liquid 311 from the reservoir on handle 321 may be controlled in the aforedescribed manner or by other convenient means.

Figure 4:
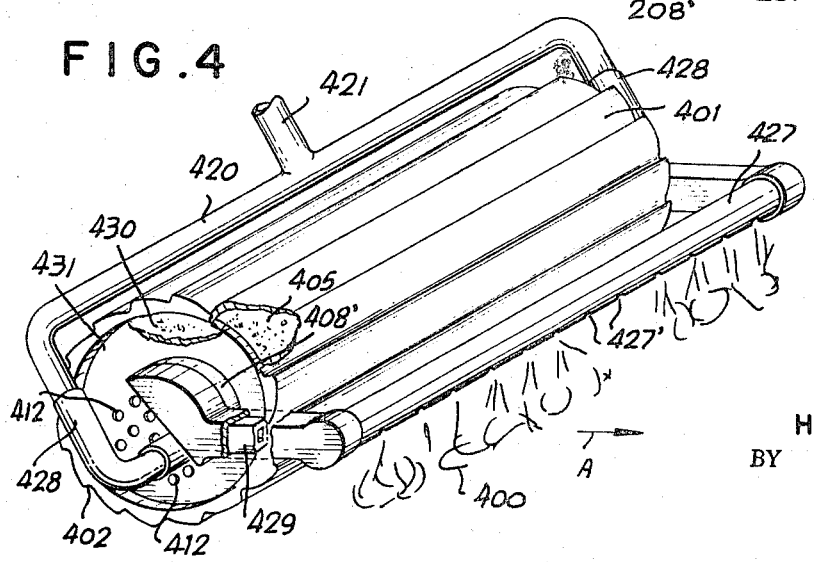
FIG. 4 shows still another embodiment in perspective view.
Figure 3:
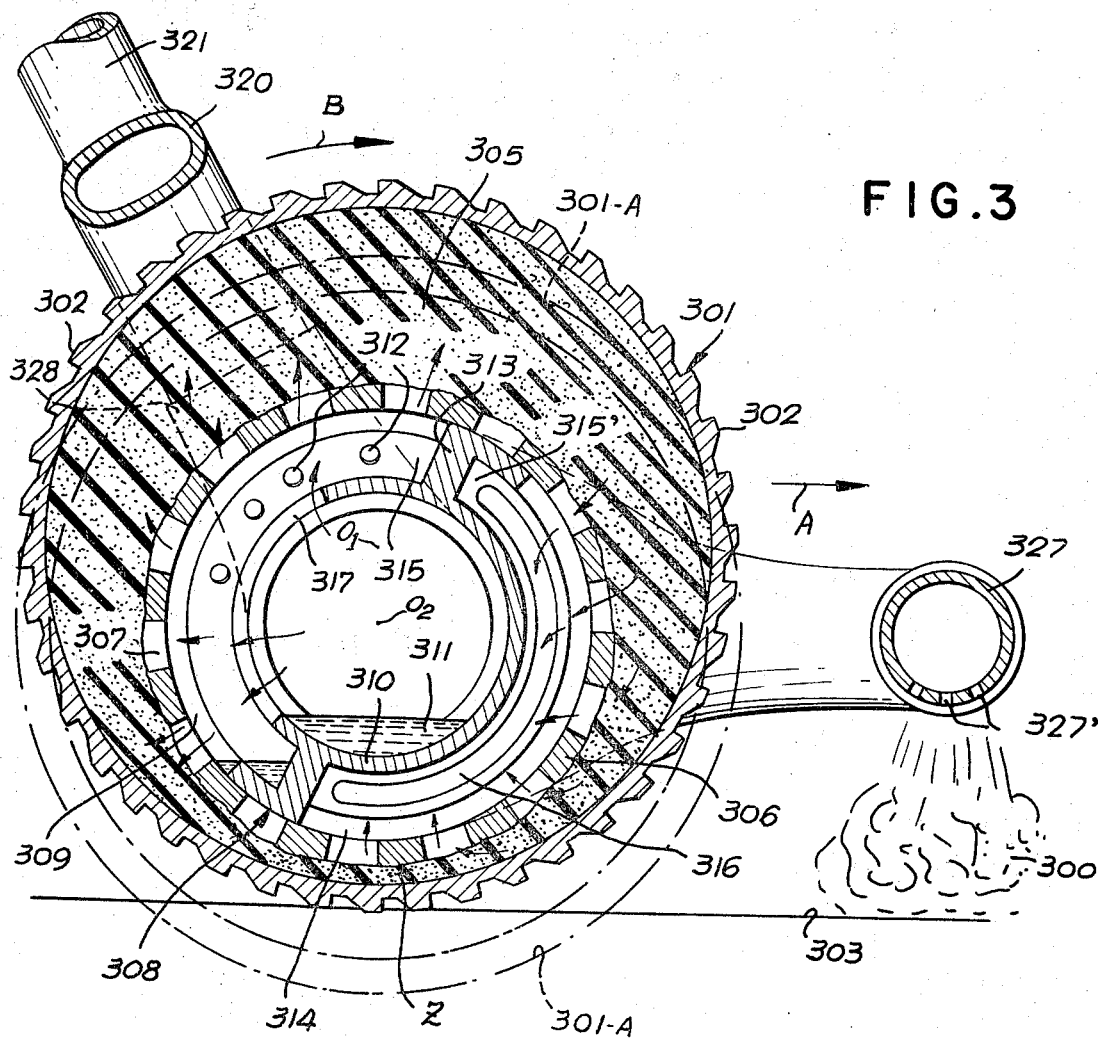
FIG. 3 is a cross-sectional view of a device constituting a further embodiment.
Figure 4A:
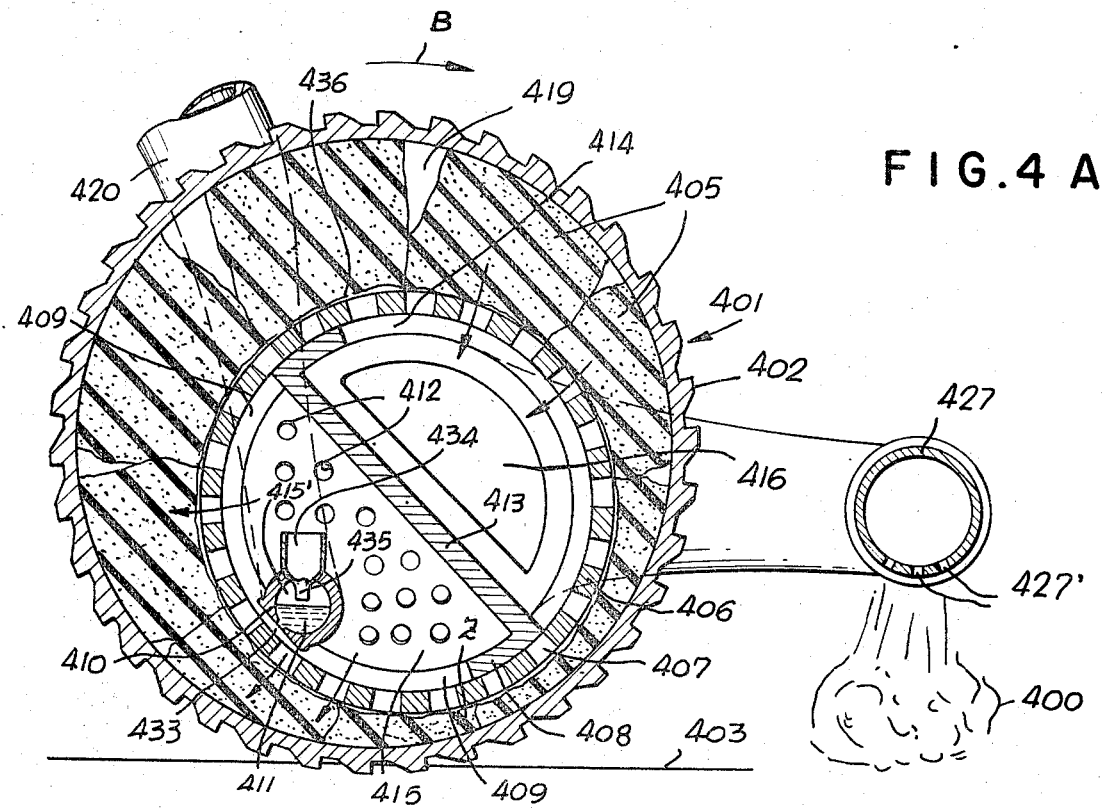
FIG. 4A is a cross-sectional view of the roller shown in FIG. 4.

The apparatus shown in FIGS. 4 and 4A differs from that of FIG. 3, primarily in the internal construction of its roller shaft 408. In this instance the shaft is axially partitioned by a central web 413 into an inlet compartment 415 and an outlet compartment 416, the two compartments again communicating through respective slots 409, 414 with the apertures 407 of a surrounding sleeve 406. In addition, a tubular partition 410 further subdivides the compartment 415 so as to create a space 415' for fluid 411 admitted endwise into this space from handle 421 through yoke 420 and either or both nipples 428. Inner tube 410 has a longitudinal slot 433 for the outflow of liquid 411 toward sleeve 406; the location of this slot is angularly spaced in an upstream direction from the zone Z of maximum compression by a distance less than 180° but sufficient to allow some air from venting holes 412 to pass through the openings 407 into the roller body ahead of the liquid 411. This arrangement insures that the air will be trapped in the cell structure behind the liquid and, upon recompression, will help expel that liquid and disperse it at the same time.

The location of the zone Z is determined in this arrangement by a pair of eccentric disks 431 (only one shown) which, disposed outwardly of the flexible end membranes 430, are rigid with the extremities 408' of shaft 408 and form a bearing for the surrounding shell 401. Distributor 427, also rigid with the roller shaft, again communicates through either or both shaft ends with the outlet compartment 416. The path between this compartment and the distributor ports 427' includes a check valve 429, or a pair of such check valves if fluid is admitted from both sides, for the purpose of preventing any return of mixture 400 to the compartment 416 upon reverse rotation of the roller (against the sense of arrow B) which could cause expansion to occur in the vicinity of compartment 416.

Another feature illustrated in FIGS. 4 and 4A is the fragmentation of the roller body into separate chunks 405 inserted between the two tubular members 401 and 406 with initial compression sufficient to insure frictional adherence to these members even in the case of greatest expansion (diametrically opposite point Z). I have found, surprisingly enough, that this fragmentation affords better control of the maximum compression to which the resilient cell structure is subjected. This can be explained by the fact that optimum operation calls for a pressure just sufficient to collapse the cell walls without compacting these walls themselves; any further rise in applied pressure would not contribute to the efficiency of the discharging operation and would encounter the increased resistance of the collapsed cell structure. With the splitting of the roller body into separate strips or blocks of generally sectoral configuration, such excess pressure appears to be partly absorbed by shear stresses between adjoining blocks and partly converted into additional compression of blocks that have not yet attained their limit of permissible compaction. The chunks 405 may extend over the full axial length of the roller body or may be longitudinally subdivided at will. This subdivision is not significant from the viewpoint of stress distribution, since pressures are substantially the same over an entire generatrix, but may be desirable for manufacturing purposes. Thus, diced chunks cut from a spongy sheet of suitable thickness have been found very effective. Cracks or airgaps 419, which may develop or exist between such chunks or strips, are not detrimental to effective operation.

In FIG. 4A I have also shown an alternate arrangement for controlling the amount of fluid in space 415' without manual control and independently of the elevation of the associated liquid reservoir. This arrangement comprises a trough 434 with one or more depending nozzles 435 descending to a predetermined level into the tube 410. As long as the liquid 411 blocks the air intake through these nozzles, virtually no fluid will leave the reservoir if the latter is closed against the outside air. Trough 434 also forms an overflow receptacle for the liquid in space 415'.

Figure 5A:
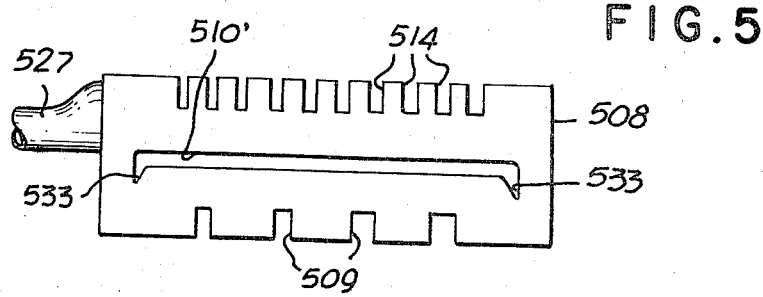
FIG. 5A is a bottom view of the shaft of the roller shown in FIG. 5.
Figure 5:
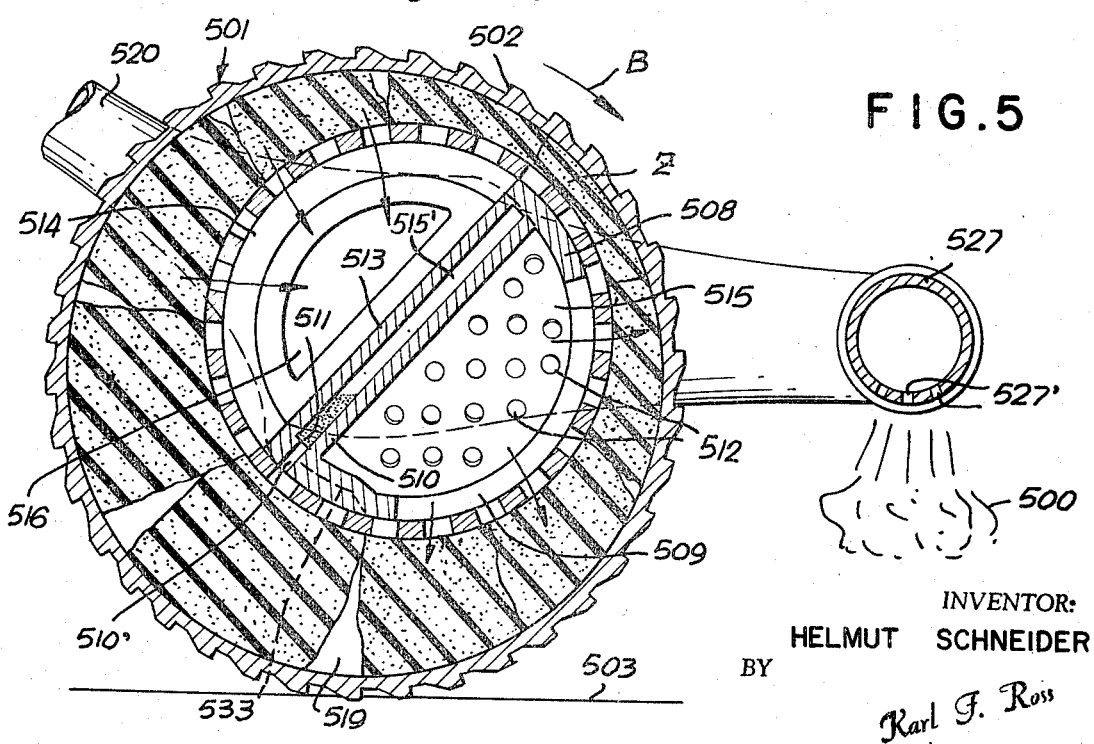
FIG. 5 is a view similar to FIG. 4A, illustrating yet a further embodiment.

FIGS. 5 and 5A show a modification of the system of FIGS. 4 and 4A wherein the compression zone Z has been relocated to the upper forward quadrant of the cylinder and wherein the tubular fluid compartment 415' of the preceding embodiment has been replaced by a diametrically extending space 515' confined between two parallel partitions 510 and 513. Compartment 515' has a reduced exit slot 510' communicating with peripheral passages 533 through which liquid 511 may reach the openings 507 of sleeve 506 at a point less than 180° downstream from zone Z, thus within the region of expansion. As best seen in FIG. 5A, the passages 533 may be a series of notches axially offset from the slots 509 of inlet compartment 515 which, advantageously, are somewhat wider than the slots 514 of outlet compartment 516. This axial staggering of the two sets of slots insures a more intensive dispersion of the surfactant particles by the air and reduces the bubble size of the resultant foam. It, as illustrated by way of example in FIG. 5A, the compartment 516 communicates only at one end with the distributor 527, the slots 514 may become progressively narrower toward that end so as to insure a substantially uniform fluid distribution within the roller body 505 by approximately equalizing the flow resistance from different parts of that body; in a symmetrical arrangement, the width of the slots 514 may be uniform or may decrease from the center of shaft 508 toward both ends.

In the nonreversibly operative systems of FIGS. 3–5, a return stroke along surface 303, 403, 503 against the direction of arrow A (which may or may not cause reverse rotation of the roller) will not lead to the discharge of any additional foam but will help spread the previously produced mixture and press it into the substrate to be treated. If desired, two identical but oppositely oriented rollers could be mounted side by side on a common handle for alternate operation during reciprocating movements.

As will be readily apparent from the foregoing description, my invention is easily applicable to any system designed to mix different fluid constituents, including gases, liquids or liquid suspensions of solid particles, with one another to form a substantially homogeneous composition.

A variety of spongy materials with open or partly open cell structure can be used in a device according to my invention. The use of resilient materials is generally more efficient and therefore preferred, although substances of limited elasticity could also be used in a system with positive relative radial displacement (FIGS. 2 and 4) between an inner sleeve and an outer shell to which the spongy roller body is adhesively bonded. Thus, I may use any of the commercially available foam rubbers and resins, such as polyurethane, polyesters, polyvinyl chloride or highly plasticized polyamides, as well as felts of straight or curled filaments of organic or inorganic materials (e.g. glass) or other fibrous structures (e.g. cotton wadding). If the spongy material is of such a nature that fiber ends or other parts thereof may tend to penetrate through the apertures 307 etc. of the inner sleeve, which should be as thin as possible to reduce the dead airspace within these apertures, it may be desirable to envelop that sleeve in a fine-mesh gauze, filter paper, wire netting or the like to prevent such penetration. This has been illustrated in FIG. 4A where the sleeve 406 has been shown surrounded by such an envelope 436; naturally, this expedient could also be used in other embodiments.

Although in FIGS. 4A and 5 I have disclosed only a single liquid-intake zone 433 or 533, it will be apparent that several such zones may be angularly spaced along the periphery of the respective inlet compartment 415 or 515 to provide for alternate aspiration of air and liquid. These and other modifications, including the combination or substitution of compatible features from different embodiments, will be readily apparent to persons skilled in the art and are intended to be encompassed within the spirit and scope of my invention as defined in the appended claims.

I claim:

1. An apparatus for producing a gas/liquid mixture, comprising:
   a hollow shaft with an inlet compartment having perforated peripheral wall;
   a tubular roller with a body of spongy material rotatably mounted on said shaft;
   operating means connected with said shaft for subjecting said body to a recurrent peripherally progressive local deformation with alternate radial compression and expansion while holding said shaft in a substantially fixed angular position in which said inlet compartment communicates via said peripheral wall with expanding portions of said body while being isolated from portions of said body undergoing compression;
   and supply means connected with said inlet compartment for concurrently admitting liquid and gaseous constituents of a desired gas/liquid mixture thereto whereby said consituents are aspirated into the interstices of said expanding portions for subsequent discharge therefrom upon their recompression.

2. An apparatus as defined in claim 1 wherein said roller includes a rigid cylindrical shell enveloping said body, said shaft having an axis offset, at least in an operative position thereof, from the axis of said shell.

3. An apparatus as defined in claim 2 wherein said shell is imperforate, further comprising partition means in said shaft separating said inlet compartment from an outlet compartment in constant communication via part of said peripheral wall with the portions of said body undergoing compression, and discharge means connected with said outlet compartment for removing said mixture therefrom.

4. An apparatus as defined in claim 3 wherein said partition means comprises an internal wall extending axially within said shaft.

5. An apparatus as defined in claim 4 wherein said compartments extend each over substantially 180° on opposite sides of said internal wall.

6. An apparatus as defined in claim 3 wherein said discharge means comprises a conduit provided with a check valve for preventing the return of removed mixture to said outlet compartment.

7. An apparatus as defined in claim 3 wherein said inlet compartment is subdivided into a first section for said liquid constituent and a second section for said gaseous constituent, said first section communicating with said body at a location spaced less than 180° downstream from a zone of maximum compression as seen in the direction of rotation of said roller, said second section communicating with said body at points between said zone and said location.

8. An apparatus as defined in claim 7 wherein said second section has a perforated end wall for the admission of atmospheric air into said inlet compartment.

9. An apparatus as defined in claim 7 wherein said peripheral wall is provided with a first set of passages extending outwardly from said first section and with a second set of passages extending outwardly from said second section, said first and second sets of passages being axially offset from each other.

10. An apparatus as defined in claim 2 wherein said roller further comprises a perforated inner sleeve rigid with said body and rotatably surrounding said shaft.

11. An apparatus as defined in claim 10 wherein said body consists of a multiplicity of generally sectoral spongy elements inserted under pressure between said sleeve and said shell.

12. An apparatus as defined in claim 2, further comprising bearing means eccentrically supporting the ends of said shaft on the inner periphery of said shell.

13. An apparatus as defined in claim 2 wherein the outer periphery of said shell is provided with ribs for rotatively entraining said roller upon displacement thereof along a contact surface.

14. An apparatus for producing a gas/liquid mixture, comprising:
- a hollow shaft with an inlet compartment having a perforated peripheral wall;
- a tubular roller with a body of spongy material rotatably mounted on said shaft;
- a handle rigidly connected with said shaft for moving said roller across a surface, thereby subjecting said body to recurrent peripherally progressive local deformation with alternate radial compression and expansion while holding said shaft in a substantially fixed angular position in which said inlet compartment communicates via said peripheral wall with expanding portions of said body while being isolated from portions of said body undergoing compression;
- and supply means connected with said inlet compartment for concurrently admitting liquid and gaseous constituents of a desired gas/liquid mixture thereto whereby said constituents are aspirated into the interstices of said expanding portions for subsequent discharge therefrom upon their recompression.

15. An apparatus as defined in claim 14 wherein said shaft is provided with level-control means for liquid delivered from said reservoir.

References Cited

UNITED STATES PATENTS

| | | | |
|---|---|---|---|
| 1,921,901 | 8/1933 | Anderson | 401—197X |
| 2,606,334 | 8/1952 | Vaden et al. | 401—197 |
| 2,627,620 | 2/1953 | Gudze | 401—197 |
| 2,972,764 | 2/1961 | Linenfelser | 401—197X |
| 2,976,559 | 3/1961 | Yonkers et al. | 401—21 |
| 3,186,024 | 6/1965 | McLemore | 401—197X |

HARLAND S. SKOLGQUIST, Primary Examiner

U.S. Cl. X.R.

222—414